(12) United States Patent
Fuji

(10) Patent No.: US 6,310,846 B1
(45) Date of Patent: Oct. 30, 2001

(54) METHOD FOR CONTROLLING THE RECORDING CONDITIONS FOR A SECOND MARK USING PREVIOUSLY DETERMINED REPRODUCING CONDITIONS FOR A FIRST MARK FOR OPTICAL MEMORY DEVICE

(75) Inventor: Hiroshi Fuji, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/190,329

(22) Filed: Nov. 12, 1998

(30) Foreign Application Priority Data

Nov. 14, 1997 (JP) .................................................... 9-313030

(51) Int. Cl.⁷ ...................................................... G11B 3/90
(52) U.S. Cl. ...................................... 369/53.31; 369/47.53
(58) Field of Search .................................... 369/13, 44.27, 369/44.29, 44.35, 54, 116, 44.31, 44.32, 44.33, 47.15, 47.17, 47.18, 47.5, 47.51, 47.53, 47.55, 53.12, 53.13, 53.18, 53.22, 53.27, 53.31, 53.37

(56) References Cited

U.S. PATENT DOCUMENTS 5,398,227 * 3/1995 Miyaoka et al. ................... 369/116
5,617,400 4/1997 Fuji .

FOREIGN PATENT DOCUMENTS 09016965 1/1997 (JP) .

* cited by examiner

*Primary Examiner*—Paul W. Huber
(74) *Attorney, Agent, or Firm*—Dike Bronstein Roberts & Cushman IP Group; David G. Angell; George W. Hartnell, III

(57) ABSTRACT

A recording conditions controlling method for an optical memory device of the present invention includes the steps of: a reproducing condition controlling step for projecting light on an optical recording medium on which information is recorded and measuring a reproducing signal read so as to control a recording condition optimum; and a recording condition controlling step for controlling a recording condition in accordance with the reproducing condition thus optimized. This prevents destruction of an optical disk by heat, which occurs when the heat capacity of the optical disk is small and/or when the environment temperature is high, thus realizing a stable control of recording light quantity.

28 Claims, 12 Drawing Sheets

FIG. 6 (a1) 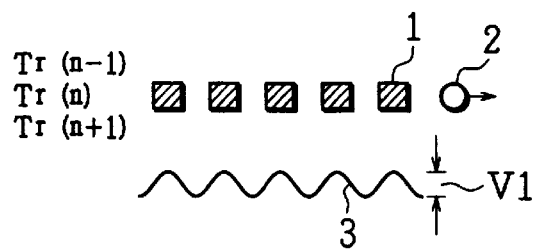
FIG. 6 (a2) 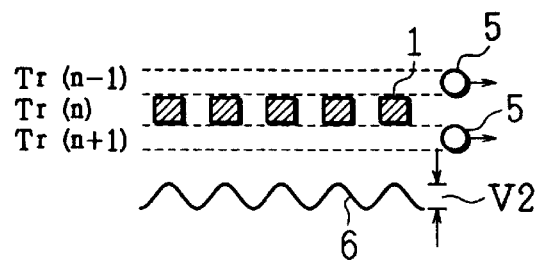
FIG. 6 (b1) 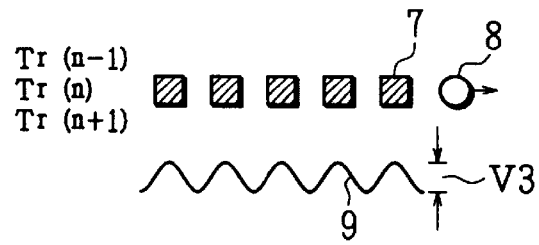
FIG. 6 (b2) 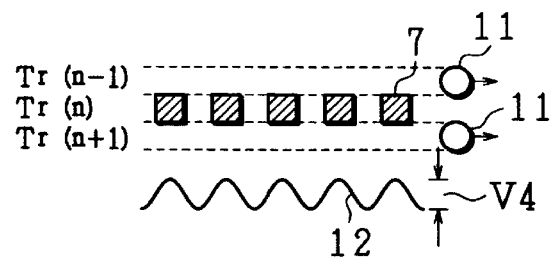
FIG. 6 (c1) 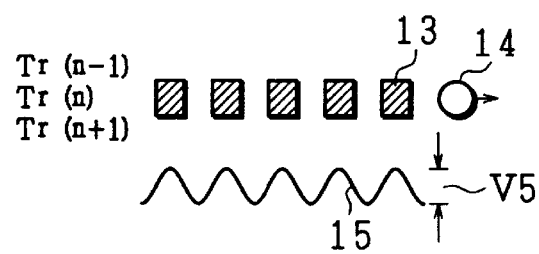
FIG. 6 (c2) 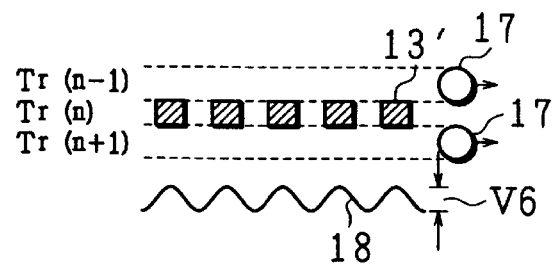

FIG. 8 (a)
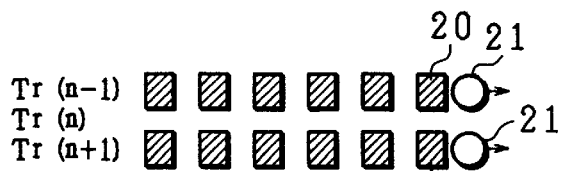
FIG. 8 (b1)
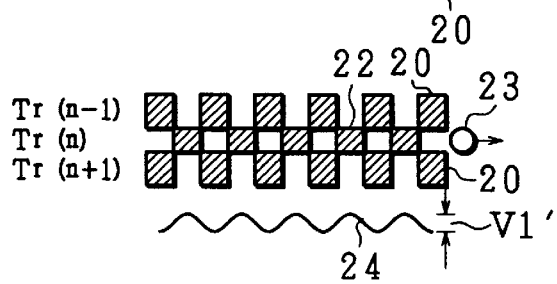
FIG. 8 (b2)
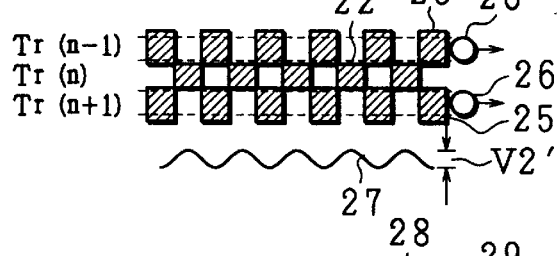
FIG. 8 (c1)
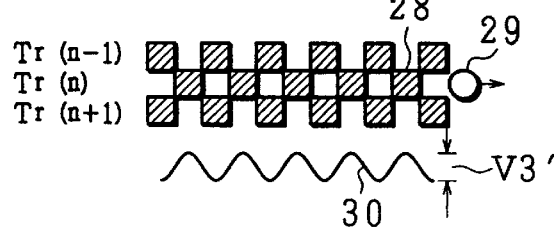
FIG. 8 (c2)
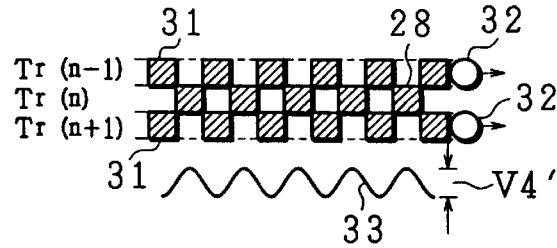
FIG. 8 (d1)
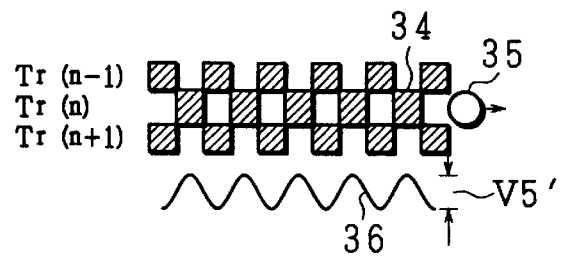
FIG. 8 (d2)
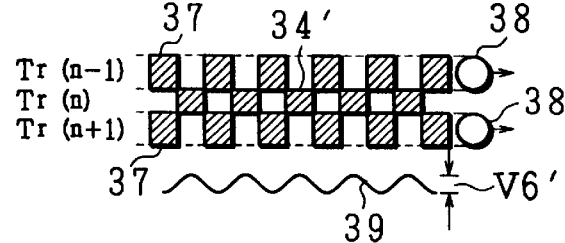

TRACK ERROR SIGNAL j

REFERENCE MARK DETECTION SIGNAL k

RECORDING CLOCK c

METHOD FOR CONTROLLING THE RECORDING CONDITIONS FOR A SECOND MARK USING PREVIOUSLY DETERMINED REPRODUCING CONDITIONS FOR A FIRST MARK FOR OPTICAL MEMORY DEVICE

FIELD OF THE INVENTION

The present invention relates to a recording conditions controlling method for an optical memory device, for optimizing recording conditions, such as light quantity of a light beam or magnetic field strength of externally applied magnetic field, in an optical memory device which records information by projection of a light beam or application of an external magnetic field to an optical recording medium.

BACKGROUND OF THE INVENTION

Despite active research on high-density optical disks in recent years, there has still been a problem that high-density recording is difficult to be carried out due to the fact that uniform recording is prevented by the change in size of record marks as caused by a change in recording light quantity of a light beam projected on an optical disk or by a change in recording magnetic field strength of an externally applied magnetic field applied on a magneto-optical disk.

As a method for solving this problem, a control method of recording light quantity as disclosed in Japanese Unexamined Patent Publication No. 16965/1997 (Tokukaihei 9-16965) has been available. This method is adopted in a so-called light modulation recording device which records data by turning on or off a light beam, and optimizes the recording light quantity during the on state. The following will describe the above method referring to FIG. 12.

First, in FIG. 12, record marks 102 are recorded on a track 101. When the recording light quantity is increased, the record marks elongate, as indicated by the broken line. This changes a duty ratio, which is the ratio of a record mark 102 to a portion (non-record mark) 103 other than the record mark 102. The change in duty ratio appears as a change in read signal so that a read signal 104a as indicated by the solid line is changed to a read signal 104b as indicated by the broken line. The change in duty ratio is detected with ease by detecting the DC components of these read signals. Further, when record marks are recorded beforehand by a plurality of different recording light quantities in a predetermined range, by searching a duty ratio of 1 to 1 from these record marks, it is possible to determine the optimum recording light quantity, which is the recording light quantity at which the duty ratio is 1 to 1.

However, when the control of recording light quantity is carried out on a disk with a small heat capacity by the described conventional method, a problem is presented that the optical disk is heated excessively by the maximum light quantity in a predetermined range of the recording light quantity and the optical disk is destroyed by the heat. The same problem is also presented when the environment temperature is high, whereby the optical disk is excessively heated by the maximum light quantity and the disk is destroyed by the heat.

SUMMARY OF THE INVENTION

It is an object of the present invention to provide a recording conditions controlling method for an optical memory device, for realizing stable recording conditions so as to prevent destruction of an optical recording medium by heat, which occurs when a heat capacity of the optical recording medium is small and/or when environment temperature is high.

In order to achieve the above-mentioned object, a recording conditions controlling method in accordance with the present invention (a) controls a reproducing condition in accordance with a reproducing signal read from a first mark of an optical recording medium so as to determine an optimum reproducing condition which minimizes an error rate of reproducing data; and (b) records a second mark by controlling a recording condition in accordance with the optimum reproducing condition and determines a recording condition which maximizes an amplitude of a reproducing signal from the second mark so as to record information on the optical recording medium in accordance with the recording condition thus determined.

In this method, the recording condition is controlled in two steps. First, the reproducing condition is controlled in accordance with the reproducing signal read from the first mark of the optical recording medium. By this control, the optimum reproducing condition which minimizes the error rate of reproducing data is determined. This optimum reproducing condition follows the heat capacity of the optical recording medium and/or with the environment temperature.

Then, the recording condition is controlled in accordance with the optimum reproducing condition thus determined, and the second mark is recorded. The recording condition which maximizes the amplitude of the reproducing signal from the second mark recorded is determined. This recording condition is determined in accordance with the optimum reproducing condition that follows the heat capacity of the optical recording medium and/or with the environment temperature, and therefore becomes the optimum recording condition. The information to be recorded is recorded on the optical recording medium in accordance with this optimum recording condition. As a result, it is possible to prevent destruction of the optical recording medium by heat when the heat capacity of the optical recording medium is small and/or when the environment temperature is high, thus realizing stable recording conditions.

For a fuller understanding of the nature and advantages of the invention, reference should be made to the ensuing detailed description taken in conjunction with the accompanying drawings.

BRIEF DESCRIPTION OF THE DRAWINGS

FIG. 6(a1), FIG. 6(a2), FIG. 6(b1), FIG. 6(b2), FIG. 6(c1), and FIG. 6(c2) are explanatory drawings respectively showing test record patterns of a recording condition controlling step of FIG. 1.

FIG. 8(a), FIG. 8(b1), FIG. 8(b2), FIG. 8(c1), FIG. 8(c2), FIG. 8(d1), and FIG. 8(d2) are explanatory drawings illustrating a recording conditions controlling method which is more sensitive than the method of FIG. 6.

DESCRIPTION OF THE EMBODIMENTS

In recent years, there has been a development in technology for improving recording density by a so-called super resolution effect, in which a light beam is projected on an optical recording medium having a reproducing layer and a recording layer on a substrate so as to generate an aperture smaller than a light spot diameter on the reproducing layer. One example of such an effect is a so-called magnetic super resolution, in which a temperature increased portion of the reproducing layer by the projection of a light beam becomes an aperture for reading recorded information as a result of magnetic coupling with the recording layer. The temperature distribution of the aperture is affected by the heat capacity of the recording medium and/or by the environment temperature, and for this reason it is required to control the size of the aperture optimum all the time by controlling the reproducing light quantity. Japanese Unexamined Patent Publication No. 63817/1996 (Tokukaihei 8-63817) discloses a device which carries out this control.

In this device, a reproducing signal quantity is detected from a short mark and from a long mark of the marks recorded on the optical recording medium, the short mark being smaller than the aperture and the long mark being larger than the aperture, so as to control the reproducing light quantity in such a manner that the ratio of reproducing signal quantity of the short mark to the long mark approaches a predetermined value. A stable control of reproducing light quantity is carried out all the time when reproducing information by reproducing a reproducing control pattern having the long mark and the short mark, which is recorded periodically between recorded information regions.

The following will describe one embodiment of the present invention with respect to a magneto-optical disk provided with an optical recording medium which exhibits such magnetic super resolution. For convenience, explanations will be given through the case of optimizing a recording light quantity in magnetic field modulation recording. Note that, because optimization of a recording magnetic field strength can be explained in substantially the same manner, the explanation thereof will be given briefly at the end of the embodiment. Accordingly, the following describes a method of searching an optimum recording light quantity while changing the recording light quantity with a constant recording magnetic field strength.

Figure 1:
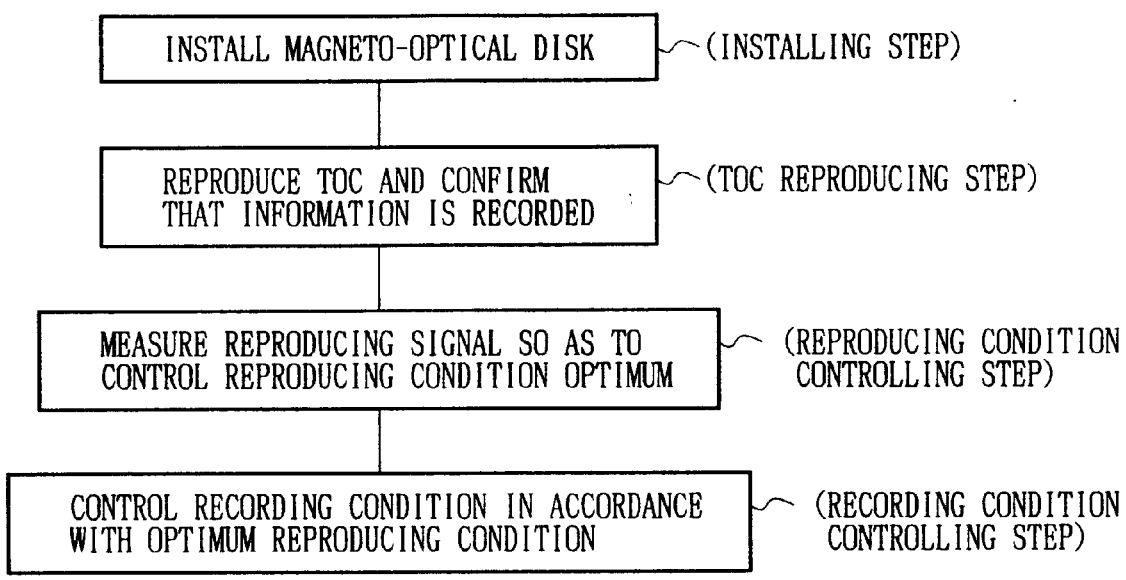
FIG. 1 is a flowchart explaining an operation of a recording conditions controlling method of one embodiment of the present invention.

FIG. 1 is a flowchart showing an operation of the embodiment of the present invention. First, a magneto-optical disk is installed in an optical memory device (installing step). Thereafter, light is projected on the magneto-optical disk and TOC (Table of Contents) is reproduced so as to confirm that information is recorded (TOC reproducing step). After confirming that information is recorded, a reproducing signal read is measured so as to control a reproducing condition optimum (reproducing condition controlling step). The reproducing condition includes reproducing light quantity and reproducing magnetic field, but will be limited to the reproducing light quantity in the following. The optimum reproducing light quantity is the value which follows the heat capacity of the magneto-optical disk and/or the environment temperature. Note that, the reproducing light quantity used here is weak so that the magneto-optical disk is not destroyed by heat.

Then, a control for recording condition is carried out in accordance with the optimum reproducing light quantity (recording condition control step). The recording condition includes recording light quantity and recording magnetic field, but will be limited to the recording light quantity in the following. When the recording condition is controlled in accordance with the optimum reproducing condition, the set range of recording light quantity follows the heat capacity of the magneto-optical disk and/or the environment temperature. Therefore, the temperature of the magneto-optical disk does not increase excessively by the maximum light quantity, and it is possible to prevent destruction by heat.

Figure 2:
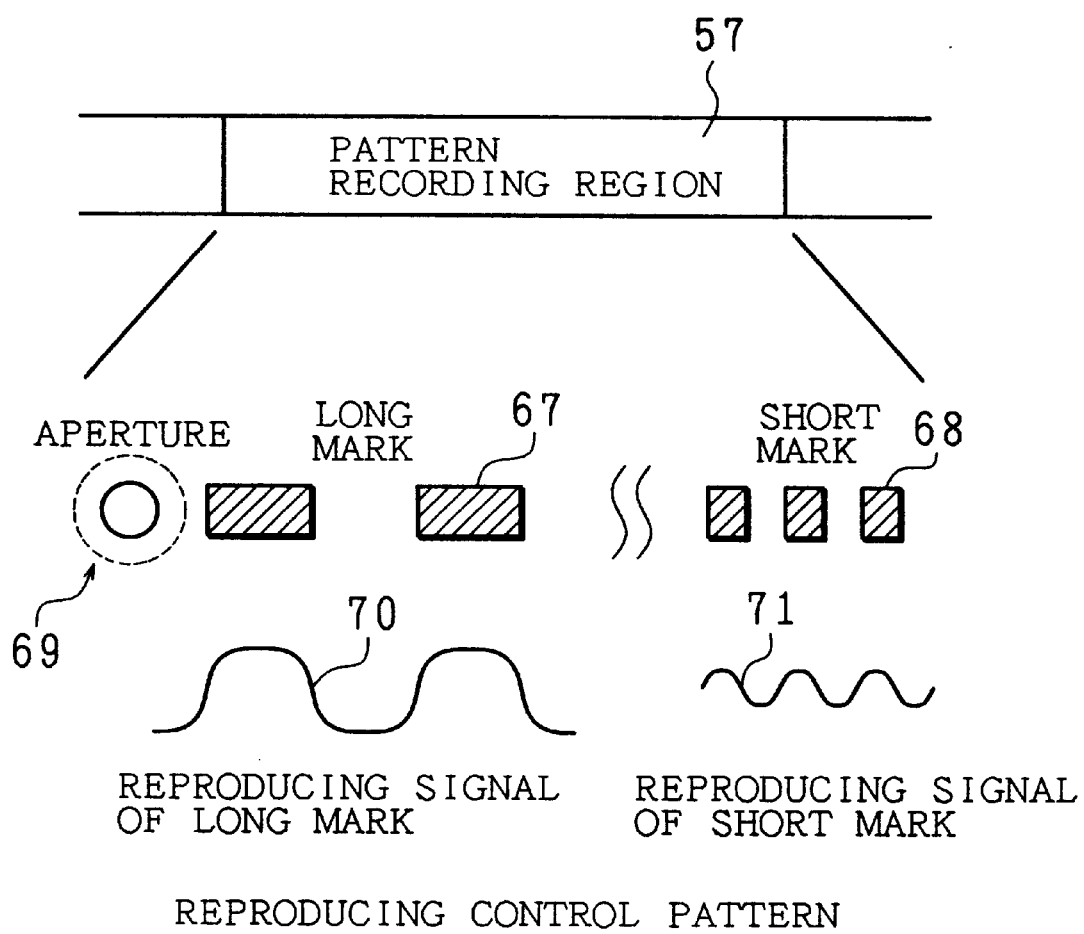
FIG. 2 is an explanatory drawing showing a reproducing control pattern of a reproducing condition controlling step of FIG. 1.
Figure 3:
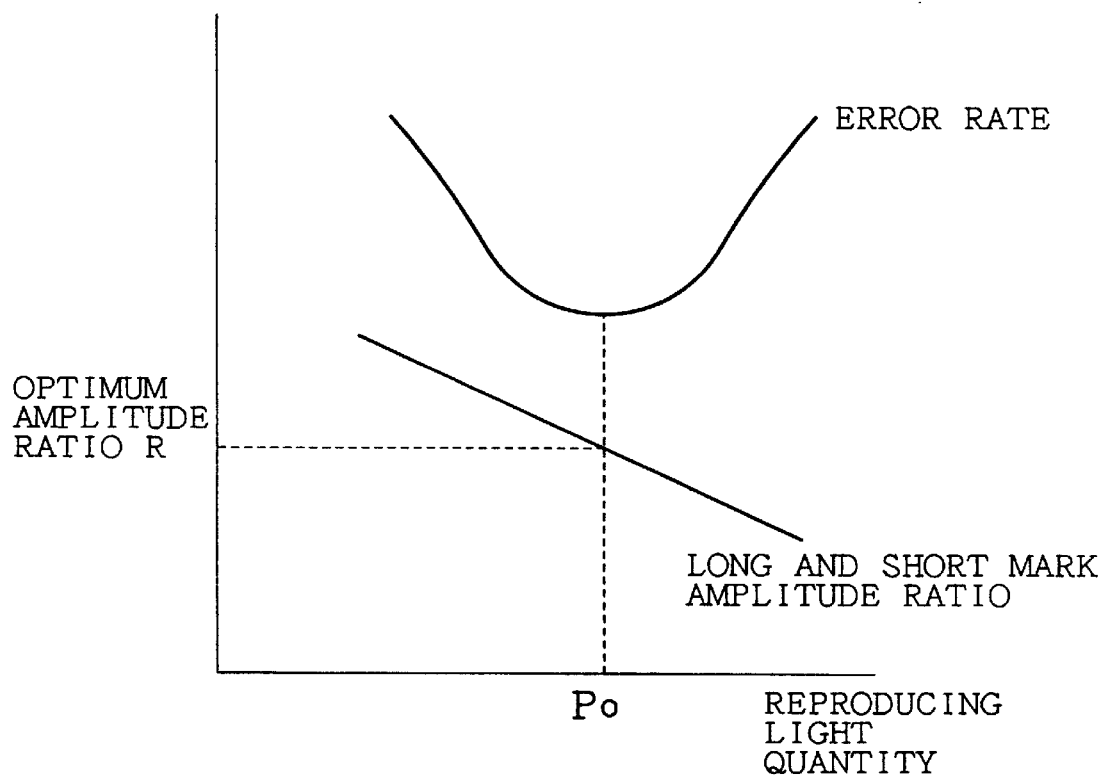
FIG. 3 is an explanatory drawing showing a change in amplitude ratio of the reproducing control pattern of FIG. 2 with respect to reproducing light quantity.

The following describes the above method in detail referring to FIG. 2 through FIG. 11. First, the reproducing condition controlling step of FIG. 1 will be described in detail. FIG. 2 and FIG. 3 are drawings explaining the relationship between the amplitude ratio of the long mark to the short mark and the reproducing light quantity in controlling of the reproducing light quantity. In FIG. 2, a reproducing control pattern composed of a long mark 67 and a short mark 68 is recorded on a pattern recording region 57 of the magneto-optical disk. The reproducing control pattern has been pre-recorded together with recorded information (described later).

When a light beam of reproducing light quantity is projected on the reproducing control pattern, an aperture 69 as shown in FIG. 2 is generated. The aperture 69 is small, as indicated by the solid line, when the reproducing light quantity is small, and is large, as indicated by the broken line, when the reproducing light quantity is large. When the long mark 67 longer than the aperture 69 is reproduced, a reproducing signal 70 having a large amplitude is obtained, and when the short mark 68 shorter than the aperture 69 is reproduced, a reproducing signal 71 having a small amplitude is obtained.

As shown in FIG. 3, the amplitude ratio (long and short mark amplitude ratio) of the reproducing signal 70 of the long mark 67 to the reproducing signal 71 of the short mark 68 becomes smaller as the reproducing light quantity is increased. The error rate of reproducing data becomes minimum at reproducing light quantity $P_o$. Thus, the error rate can be minimized when the reproducing light quantity is controlled in such a manner that the long and short mark amplitude ratio approaches optimum amplitude ratio R. Therefore, even when optical disks having different heat capacities are installed and/or the environment temperature is changed, because the operation of reproducing control follows such changes, it is possible to always obtain desirable reproducing characteristics. Here, the optimum reproducing light quantity $P_o$ is increased or decreased in accordance with a change in heat capacity of the optical disk and/or a change in environment temperature. Note that, instead of the reproducing control pattern, it is possible to use long and short marks included in the recorded information.

Figure 4:
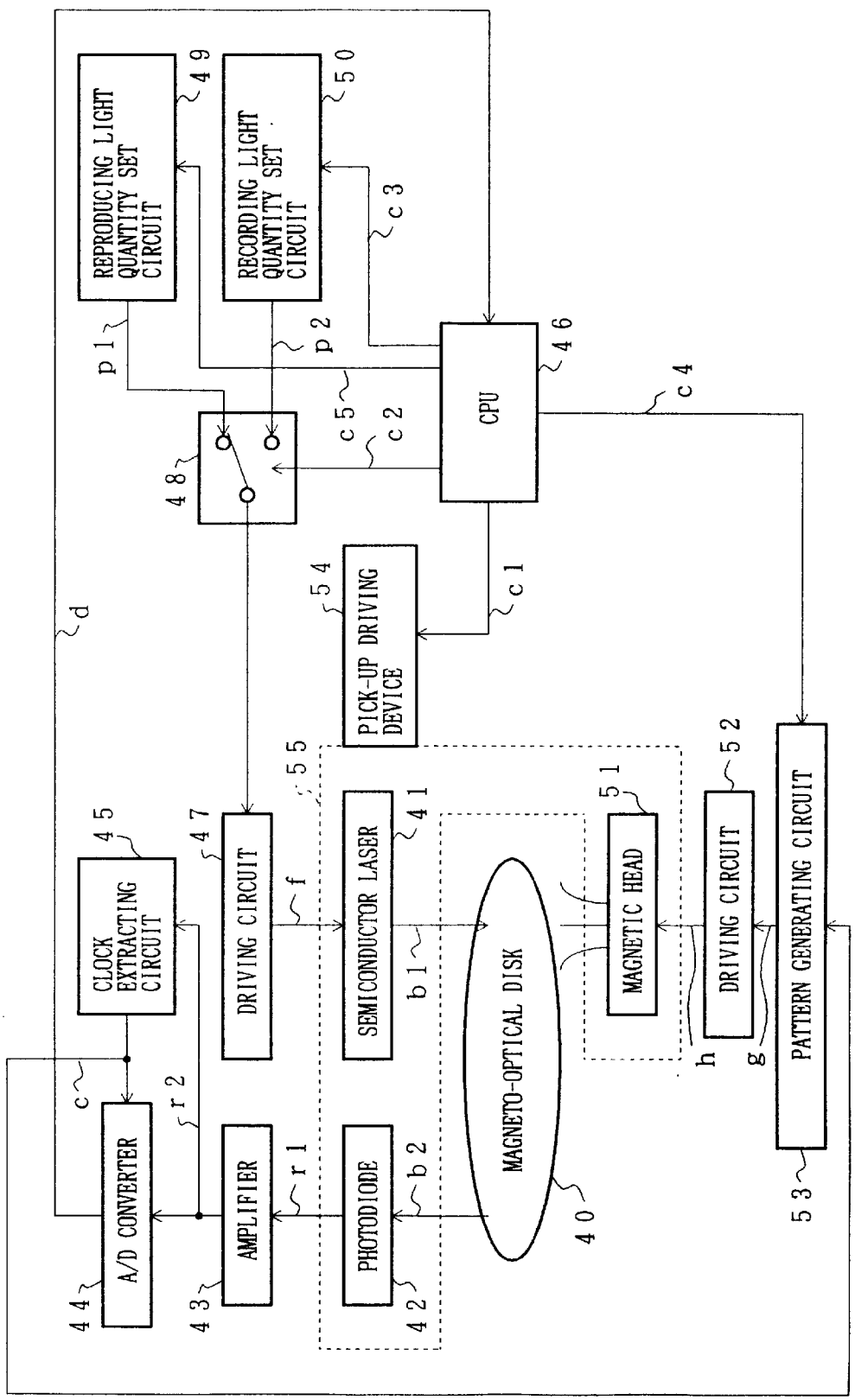
FIG. 4 is an explanatory drawing showing an example of a structure of a device for realizing the recording conditions controlling method of FIG. 1.

The following describes a device for carrying out the control of reproducing light quantity, referring to FIG. 4. A control command c5 is sent to a reproducing light quantity set circuit 49 from a CPU 46 and the reproducing light quantity is set to an initial value. A switch command c2 is sent to a switch circuit 48, and a reproducing light control signal p1 from the reproducing light quantity set circuit 49 is sent to a driving circuit 47 via the switch circuit 48. In accordance with a driving current f outputted from the driving circuit 47, a semiconductor laser 41 projects a laser beam b1 of a small light quantity onto a magneto-optical disk 40. Reflected light b2 is guided to a photodiode 42. A read signal ri read out from the magneto-optical disk 40, after amplified by an amplifier 43, is inputted as a reproducing signal r2 to an A/D converter 44 and to a clock extracting circuit 45. The clock extracting circuit 45 generates an external clock c (mentioned later) from the reproducing signal r2, and the external clock c is sent to the A/D converter 44, and the reproducing signal r2 is converted to a digital signal d. The digital signal d is sent to the CPU 46, and the amplitude of the read signal r2 of each of the long mark and short mark is detected therein. The CPU 46 further calculates an amplitude ratio from the amplitudes of the long mark and the short mark thus detected so as to control the reproducing light quantity in such a manner that the amplitude ratio approaches the optimum amplitude ratio R of FIG. 3, thereby carrying out the control of reproducing light quantity for minimizing the error rate of reproducing data.

Note that, the above explanation is based on the case where the reproducing control pattern has already been recorded. The following briefly describes the recording operation of this reproducing control pattern. The control command c3 is sent to a recording light quantity set circuit 50 from the CPU 46, and a recording light quantity control signal p2 is outputted. Note that, the recording light quantity used here has already been recorded, for which a small quantity is selected, when the magneto-optical disk is shipped from the factory. The recording light quantity control signal p2 is sent to the driving circuit 47 via the switch circuit 48 in accordance with the switch command c2 from the CPU 47, and the semiconductor laser 41 projects the laser beam b1 of a large light quantity onto the magneto-optical disk 40 in accordance with the driving current f. At the same time, the CPU 46 sends a control command c4 to a pattern generating circuit 53 and a test record pattern is recorded together with recorded information.

Figure 5:
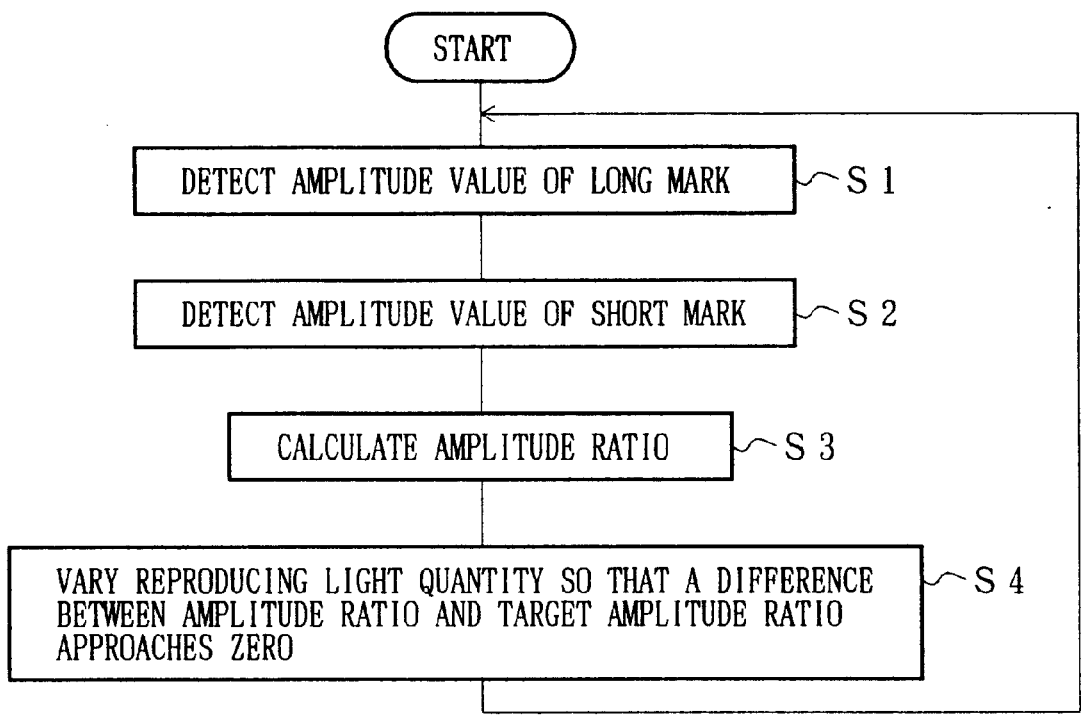
FIG. 5 is a flowchart explaining the reproducing condition controlling step of FIG. 1 in detail.

FIG. 5 is a flowchart explaining the operation of the reproducing light quantity control of FIG. 4. First, the amplitude value of the long mark is detected from the reproducing control pattern (S1). Secondly, the amplitude value of the short mark is detected (S2). Thirdly, the ratio of amplitude value of the long mark to the short mark is calculated (S3). Finally, the reproducing light quantity is changed so that the amplitude ratio thus calculated approaches the target amplitude ratio (S4). Then, the sequence returns to S1 and the control of reproducing light quantity is repeated, thereby realizing the control of reproducing light quantity, which minimizes the error rate.

The following describes recording condition control step of FIG. 1 in detail. When the recording light quantity is inappropriate in magnetic modulation recording, the width of the record mark is widened or narrowed. The easiest way to optimize the width of the record mark is to detect, from the reproducing signal quantity, the amount by which the width of the record mark has been reduced as a result of erasure of the edges of the record mark by the seeping out of erasing of adjacent tracks. The following described this method referring to FIG. 6.

First, in FIG. 6(a1), while projecting a light beam 2 of a small recording light quantity on a track Tr(n), a recording magnetic field is reversed so as to record record marks 1. Here, because the record marks 1 are narrower than the track width, amplitude V1 of a read signal 3 obtained when the record marks 1 are read is small. Then, in FIG. 6(a2), adjacent tracks Tr(n−1) and Tr(n+1) are erased by light beams 5 having the same recording light quantity as the light beam 2. For example, in land/groove recording which is a well-known system of recording adopting high-density tracks, the track Tr(n) is a groove, and the tracks Tr(n−1) and Tr(n+1) are lands. The width of each of erased regions is substantially the same as the width of the record marks 1, and the regions indicated by the broken lines are erased. Here, the erased width is narrow and therefore the edges of the record marks 1 are not erased. Here, amplitude V2 of a read signal 6 read from the record marks 1 is the same as the amplitude V1.

When the above operation is repeated by gradually increasing the recording light quantity, the width of the record marks 1 and the width of the erased regions as indicated by the broken lines are both widened gradually, and the edges of these regions come closer to each other. In FIG. 6(b1), record marks 7 are recorded on the track Tr(n) by a light beam 8, and in FIG. 6(b2), the adjacent tracks Tr(n−1) and Tr(n+1) are erased by light beams 11, and the edges of erased regions contact the edges of the record marks 7. Here, the width of the record marks 7 is maximum and there is no adverse effect of the seeping out of erasing of the adjacent tracks. Therefore, amplitude V3 of a read signal 9 of FIG. 6(b1) is maintained and is equal to amplitude V4 of a read signal 12 of FIG. 6(b2), at which the amplitude value is maximum.

However, when the recording light quantity is kept increased beyond this point, the edges of the record marks 7 start being erased gradually by the seeping out of erasing of the adjacent tracks and the width of the record marks 7 gradually becomes narrower. In FIG. 6(c1), when recording is carried out while projecting a light beam 14 of a large recording light quantity on the track Tr(n), record marks 13 wider than the track width are recorded. Here, amplitude V5 of a read signal 15 of the record marks 13 increases temporarily. Then, in FIG. 6(c2), the adjacent tracks Tr(n−1) and Tr(n+1) are erased by light beams 17 having the same recording light quantity as the light beam 14. As a result, the width of the erased regions becomes substantially the same as the width of the record marks 13, and the regions as indicated by the broken lines are erased. Here, the erased width is wide and therefore edges of the record marks 13 are erased, leaving only the central portion, which becomes record marks 13'. Here, because the width of the record marks 13' is narrow, amplitude V6 of a read signal 18 read from the record marks 13' is significantly smaller than the amplitude V5.

Figure 7:
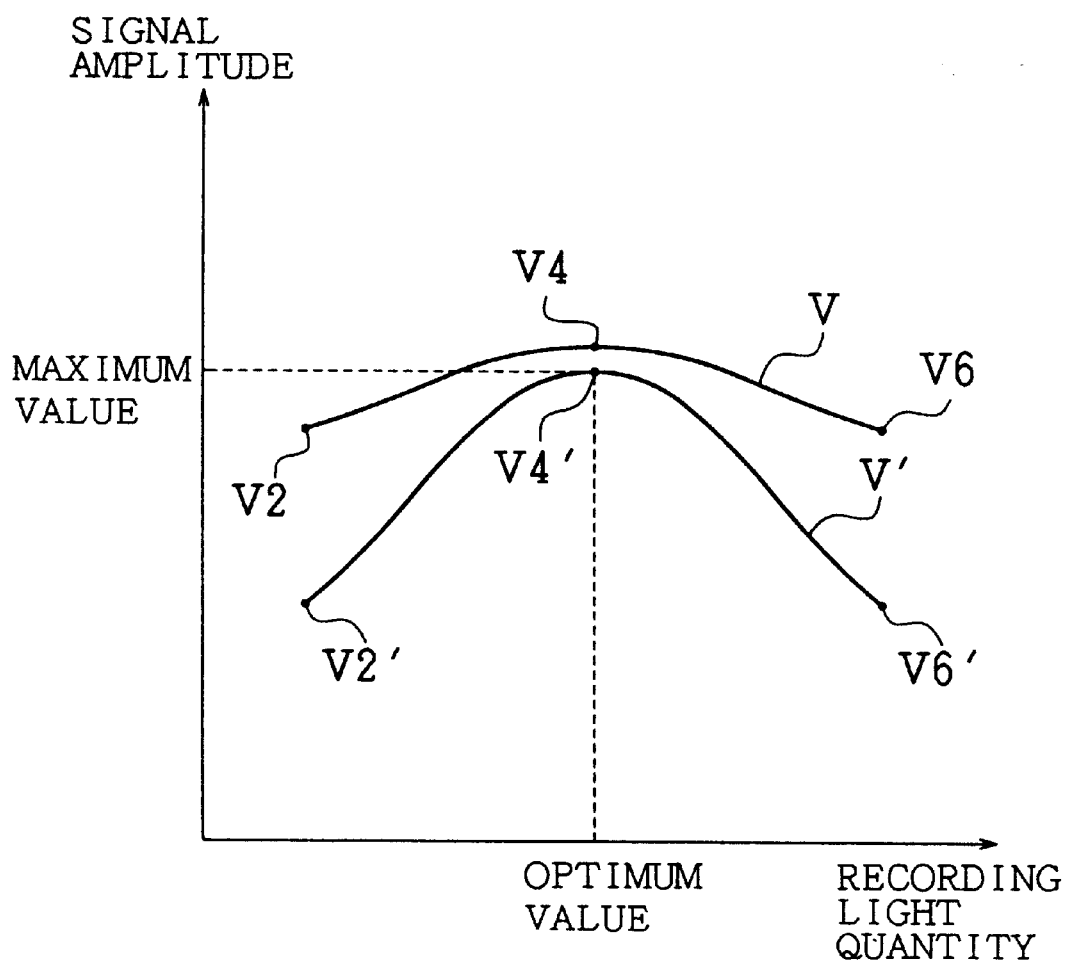
FIG. 7 is an explanatory drawing showing a result of measurement of reproducing light quantity dependency of detection sensitivity.
Figure 9:
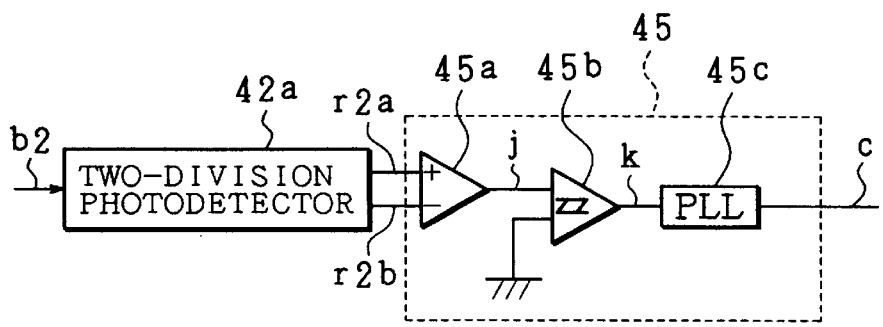
FIG. 9(a) through FIG. 9(e) are circuit diagrams respectively showing an example of a structure of a clock extracting circuit of FIG. 4.
Figure 9:
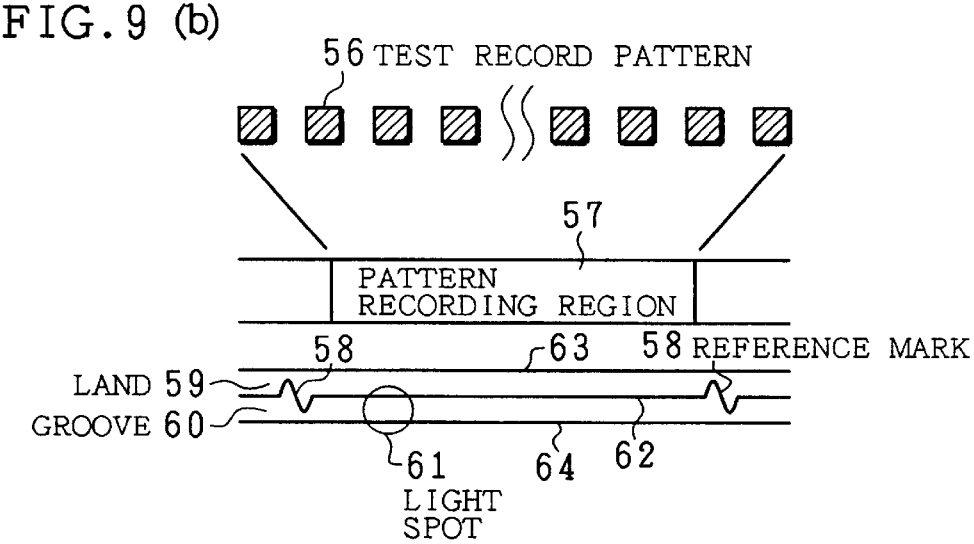
Figure 9:
Figure 9:
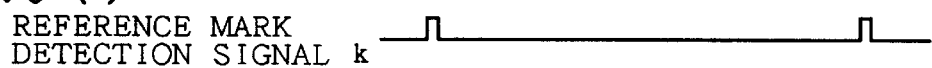
Figure 9:

FIG. 7 is a plot of a change in amplitude of the read signals after erasing of the adjacent tracks of FIG. 6(a2), FIG. 6(b2), and FIG. 6(c2) with respect to an increasing recording light quantity. Signal amplitude V is small when the recording light quantity is small, but is gradually increased as the recording light quantity is increased. However, just as the recording light quantity reaches the point where the edges of the record marks and the edges of the erased regions come into contract with each other, the edges of the record marks start being erased gradually in accordance with an increase in the recording light quantity, and as a result the signal amplitude V decreases. Therefore, at the recording light quantity at which the signal amplitude V is maximum, the edges of the record marks are not erased and it is possible to obtain the maximum width of the record mark. Thus, the described operation is repeated while gradually increasing the recording light quantity, and the recording light quantity which gives the maximum signal amplitude V is set to be the optimum recording light quantity. In this manner, a change in width of the record marks is detected by a change in amplitude of the read signals, thus controlling the recording light quantity optimum. Note that, in the magnetic field modulation recording, because a change in recording light quantity only changes the width of the record marks, the recording light quantity can be changed with higher sensitivity compared with the case of the light modulation recording.

Incidentally, to optimize the recording magnetic field strength, the described operation is carried out by gradually increasing the recording magnetic field strength while keeping a constant recording light quantity. This allows the width of the record marks to be optimumly controlled by a change in amplitude of read signals.

The following describes, referring to FIG. 8, a method of detecting the maximum value with higher sensitivity by further increasing the change in signal amplitude of the method of FIG. 6.

In FIG. 8($a$), record marks 20 having a wide width are recorded beforehand on the adjacent tracks Tr(n−1) and Tr(n+1) by light beams 21 having a large recording light quantity. Here, recording is carried out in accordance with (in synchronization with) a recording clock of external clock system (described later). The recording pattern of the record marks 20 is obtained by reversing a test record pattern recorded on the track Tr(n), which will be described later. Hereinafter, the pattern recorded on the tracks Tr(n−1) and Tr(n+1) will be referred to as a reversed test record pattern, whereas the pattern recorded on the track Tr(n) will be referred to as a test record pattern.

Then, in FIG. 8($b$1), while projecting a light beam 23 having a small recording light quantity on the track Tr(n), the recording magnetic field is reversed so as to record a recording pattern 22 of the test record pattern. Here, the pattern is recorded in accordance with (in synchronization with) the recording clock of external clock system (described later) and therefore recording is carried out in synchronization with the reversed test record pattern of the adjacent tracks. The width of the record mark 22 is narrow and accordingly amplitude V1' of a read signal 24 is small. Further, because the record marks 20 of the reversed test record pattern are recorded on the adjacent tracks, by the crosstalk in reproduction, the signal component of the record mark 22 is reduced and the signal amplitude V1' is further reduced.

Then, in FIG. 8($b$2), a reversed test record pattern is recorded on the adjacent tracks Tr(n−1) and Tr(n+1) by light beams 26 having the same recording light quantity as the light beam 23. The width of the recording region of this pattern is substantially the same as the width of the record mark 22, and record marks 25 as indicated by the broken lines are recorded. Here, because the recording is carried out in accordance with the recording clock of external clock system, the record marks 25 are recorded in an overlapping manner on the record marks 20 which have been recorded already. Here, because the width of the record marks 25 of the adjacent tracks is narrow, the edges of the record mark 22 are not erased. Also, on the adjacent tracks, the record marks 25 do not spread over the width of the pre-recorded record marks 20. Thus, amplitude V2' of a read signal 27 is the same as the amplitude V1'. As described, the narrower the width of the record mark 22, the smaller the signal amplitude V2', and the wider the width of the record marks 20 of the adjacent tracks, the smaller still even the signal amplitude V2'. Namely, a decrease in signal amplitude at a small recording light quantity is further amplified by the crosstalk of the reverse pattern of the adjacent tracks.

When the described operation is repeated while gradually increasing the recording light quantity, the width of the record mark 22 and the width of the record marks 25 as indicated by the broken lines are widened gradually, and the edges of these marks come closer to each other. In FIG. 8($c$1), a record mark 28 is recorded on the track Tr(n) by a light beam 29, and in FIG. 8($c$2), a reversed test record pattern is recorded on the adjacent tracks Tr(n−1) and Tr(n+1) by light beams 32. Here, the edges of the record marks 31 contact the edges of the record mark 28. As a result, signal amplitude V3' of a read signal 30 of FIG. 8($c$1) and signal amplitude V4' of a read signal 33 of FIG. 8($c$2) become equal to each other. Also, the width of the record mark 28 is maximized and the width of the record marks 31 of the adjacent tracks is minimized. Accordingly, the signal component from the record mark 28 is maximized and the crosstalk component from the adjacent tracks is minimized, thus maximizing the signal amplitude V4' of the read signal 33.

However, when the recording light quantity is kept increased beyond this point, the edges of the record mark 28 start being erased accordingly and the width thereof becomes narrower. Further, the width of the record marks of the adjacent tracks becomes wider and the crosstalk is increased. In FIG. 8($d$1), when the test record pattern is recorded while projecting a light beam 35 having a large recording light quantity on the track Tr(n), a record mark 34 wider than the track width is recorded. Here, amplitude V5' of a read signal 36 from the record mark 34 is increased temporarily.

Then, in FIG. 8($d$2), a reversed test record pattern is recorded on the adjacent tracks Tr(n−1) and Tr(n+1) by light beams 38 having the same recording light quantity as the light beam 35. The width of the record mark 37 is substantially equal to the width of the record mark 34. Here, because the width of the recording region of the reversed test record pattern is wide, the edges of the record mark 34 are erased, leaving only the central portion, which becomes a record mark 34'. The width of the record mark 34' is narrow and as a result amplitude V6' of a read signal 39 read from the record mark 34' is reduced. Further, by the crosstalk from the record marks 37 of the adjacent tracks, the signal component of the record mark 34' is reduced, further reducing the signal amplitude V6'. Namely, there is a decrease in signal amplitude due to cross-erase in the case where the recording light quantity is large, and such a decrease is further amplified by the crosstalk of the reversed test record pattern of the adjacent tracks.

The amplitudes of the read signals as indicated in FIG. 8($b$2), FIG. 8($c$2), and FIG. 8($d$2) are denoted by V' in FIG. 7. The signal amplitude V' at a small recording light quantity is significantly smaller than the signal amplitude V. This is due to the fact that the component of the record marks of the test record pattern of FIG. 8 is reduced by the crosstalk from the reversed test record pattern of the adjacent tracks. As the recording light quantity is increased, the width of the record marks becomes wider and the crosstalk is reduced. As a result, the signal amplitude gradually increases and approaches the signal amplitude V of FIG. 7. The signal amplitude becomes the maximum when the edges of the test record pattern and the edges of the recording width of the reversed test record pattern contact each other. When the recording light quantity is further increased, the edges of the record marks of the test record pattern are gradually erased, and the width of the record marks of the adjacent tracks becomes wider, and as a result the signal amplitude V' is reduced significantly. At the recording light quantity where the signal amplitude V' takes the maximum value, the width of the record marks is maximized and the crosstalk from the adjacent tracks is minimized. As described, by recording the reversed test record pattern on the adjacent tracks, the amount by which the signal amplitude V' is changed becomes larger compared with the case of the signal amplitude V as in the method of FIG. 6, thus detecting the maximum value of the signal amplitude with high sensitivity.

Note that, instead of the method of FIG. 7 for determining the maximum value, it is possible alternatively to adopt a method which determines an intermediate value of two recording light quantities of when the signal amplitude crosses a predetermined value. The optimum value of the recording light quantity can also be determined by this method.

The following describes a device for controlling the recording light quantity referring again to FIG. 4. First, when recording the test record pattern, the control command c3 is sent to the recording light quantity s et circuit 50 from the CPU 46 and the record ing light quantity control signal p2 is outputted. Here, a recording light quantity multiplied by a predetermined coefficient is set using the optimum reproducing light quantity as a reference. The recording light quantity control signal p2 is sent to the driving circuit 47 via the switch circuit 48 in accordance with the switch command c2 from the CPU 46, and the semiconductor laser 41 projects the laser beam bi of a strong light quantity onto the magneto-optical disk 40 in accordance with the driving current f. At the same time, the CPU 46 sends the control command c4 to the pattern generating circuit 53, and a recording signal g of the test record pattern and the reversed test record pattern are generated. The recording signal g is sent to a driving circuit 52, and as a driving current h, sent to a magnetic head 51. In response to this, the magnetic head 51 generates a magnetic field and the test re cord pattern and the reversed test record pattern are recorded on the magneto-optical disk 40.

Note that, the optimum reproducing light quantity determined in the described manner follows the heat capacity of the magneto-optical disk and/or the environment temperature. Therefore, when the recording light quantity is set in accordance with this optimum reproducing light quantity, the set range of the recording light quantity also follows the heat capacity of the optical disk and/or the environment temperature. As a result, the temperature of the magneto-optical disk does not increase excessively by the maximum light quantity, and it is possible to prevent destruction by heat.

The following describes amplitude detection of the reproducing signal r2 from the test record pattern, referring to FIG. 4.

The CPU 46 sends the control command c5 to the reproducing light quantity set circuit 49 and the optimum reproducing light quantity is set. Then, the switch command c2 is sent to the switch circuit 48 and the reproducing light quantity control signal p1 from the reproducing light quantity set circuit 49 is sent to the driving circuit 47 via the switching circuit 48. In accordance with the driving current f outputted from the driving circuit 47, the semiconductor laser 41 projects the laser beam bl of the optimum reproducing light quantity onto the magneto-optical disk 40. The external clock c generated from the read signal r2 is sent to the pattern generating circuit 53 and as a result the test record pattern and the reversed test record pattern are recorded in synchronization with this sequence. A read signal d outputted from the A/D converter 44 is sent to the CPU 46 and the signal amplitude is detected therein.

The photodiode 42, the semiconductor laser 41, and the magnetic head 51 are included in a pick-up 55 surrounded by the broken line. The CPU 46 sends the control command c1 to a pick-up driving device 54, and the light beam b1 is moved so as to be projected on the track Tr(n) and the adjacent tracks Tr(n−1) and Tr(n+1).

The CPU 46 successively increases the recording light quantity in accordance with the control command c3, and while moving the light beam to the track and the adjacent tracks in accordance with the control command c1, records the test record pattern and the reversed test record pattern in accordance with the control command c4. Then, the CPU 46 successively stores the amplitude of the read signal d per recording light quantity, and the recording light quantity at which the amplitude value is maximum is decided to be the optimum recording light quantity.

Note that, the above explanation is based on the case where the optimum reproducing light quantity is set when detecting the test record pattern. However, in order to detect crosstalk and cross-erase of the adjacent tracks with higher sensitivity, it is preferable that the aperture generated on the reproducing layer is widened in the width direction of the record mark. For this reason, it is preferable to increase the reproducing light quantity by adding only a predetermined amount to the optimum reproducing light quantity when detecting the test pattern only. Here, the amount by which the reproducing light quantity is increased is preferably in a range of 5 percent to 20 percent.

FIG. 9(a) is a drawing explaining an example of the structure of the clock extracting circuit 45 of FIG. 4 (structure of amplifier 43 is omitted). The reflected light b2 off the magneto-optical disk 40 is inputted to a two-division photodetector 42a. Two output signals r2a and r2b are inputted to a differential amplifier 45a of the clock extracting circuit 45 surrounded by the broken line. As a result, a track error signal j of a well-known push-pull system is obtained. The track error signal j includes a read signal from a reference mark which will be explained later, and in order to detect this reference mark, the track error signal j is compared with a ground level by a hysterisis converter 45b. A reference mark detection signal k obtained is inputted to a PLL circuit 45c, and the external clock c in synchronization with the reference mark is outputted from the PLL circuit 45c.

FIG. 9(b) and FIG. 9(c) are waveform drawings explaining the operation of the clock extracting circuit 45 of FIG. 9(a). In FIG. 9(b), the test record pattern and the reversed test record pattern are recorded on the tracks of a land 59 and a groove 60, respectively. Here, for convenience, the track Tr(n) is represented by the groove 60, and the track Tr(n−1) is represented by the land 59, and the track Tr(n+1) is omitted.

In a direction along the tracks, reference marks 58 and the pattern recording region 57 are positioned alternately and repeatedly, and record marks 56 of the test record pattern and the reversed test record pattern are recorded on the pattern recording region 57. The reference marks 58, which are unerasable, for indicating a physical reference position of the magneto-optical disk 40 are provided by periodic wobbling of a side wall 62 sandwitched between the land 59 and the groove 60. Because only the side wall 62, not side walls 63 and 64, sandwiched between the land 59 and the groove 60 is wobbled, crosstalk with a reference mark (not shown) adjacent in a perpendicular direction to the track is reduced. The pattern recording region 57 is provided as a unit segmented by the reference marks 58.

As shown in FIG. 9(c) through FIG. 9(e), for example, when the groove 60 is tracked by a light spot 61, the track error signal j includes a read signal from reference marks 58. When the read signal thus obtained is binarized, the reference mark detection signal k is obtained. In response to an input of this reference mark detection signal k, the PLL circuit 45c outputs the external clock c synchronizing with the reference marks 58.

Figure 10:
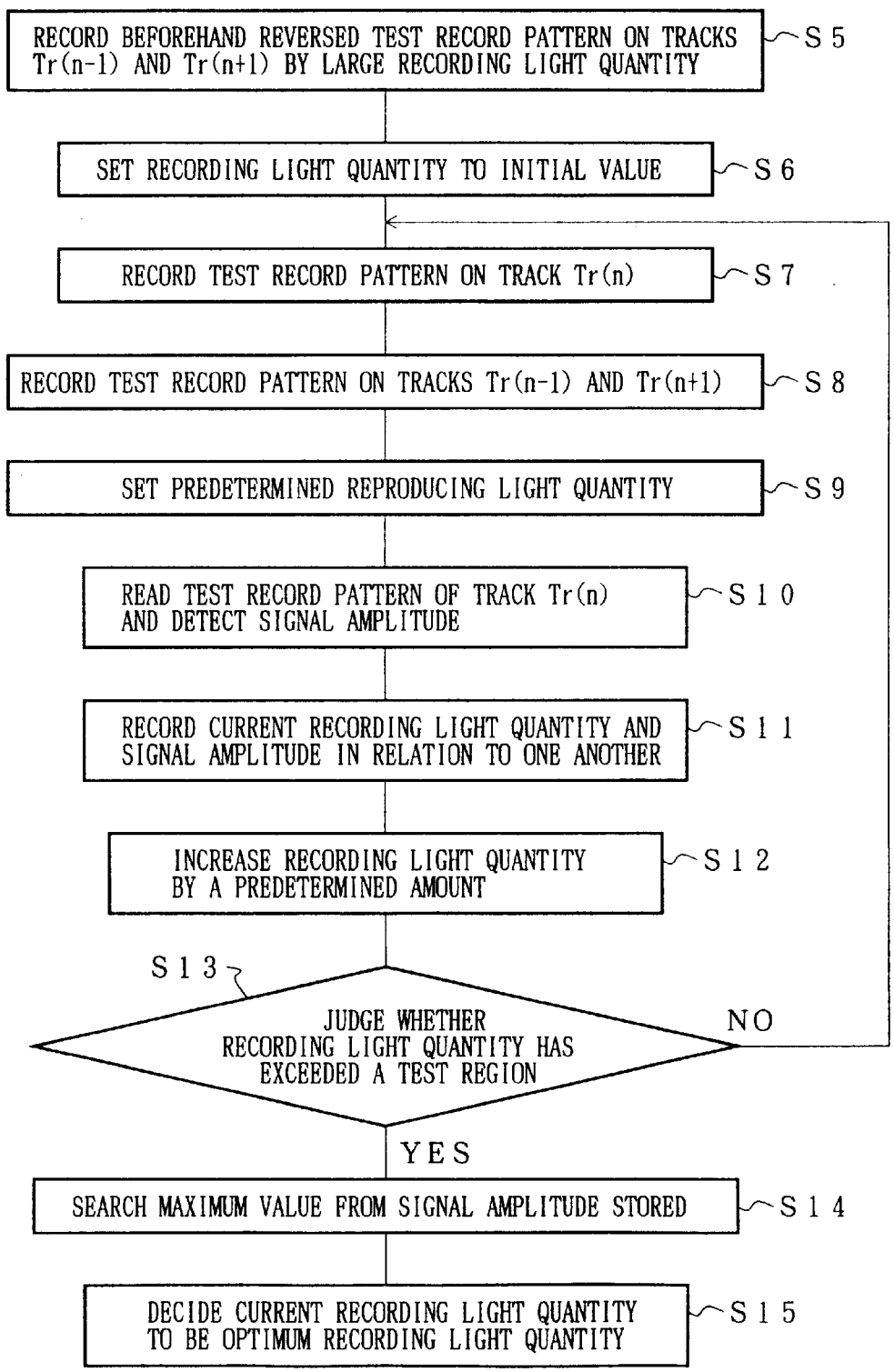
FIG. 10 is a flowchart explaining the recording condition controlling step of FIG. 1 in detail.

FIG. 10 is a flowchart which explains in detail the control operation of the recording light quantity as indicated in FIG. 1. First, the reversed test record pattern is recorded beforehand on the adjacent tracks Tr(n−1) and Tr(n+1) with a large recording light quantity (S5). Here, the recording light quantity is set to $(a+b) \times P_o$ in accordance with the optimum reproducing light quantity $P_o$, where a>1 and b>0. Then, the recording light quantity is set to a low initial value of $a \times P_o$ (S6). The test record pattern is recorded on the track Tr(n) (S7). The reversed test record pattern is recorded on the adjacent tracks Tr(n−1) and Tr(n+1) by the same recording light quantity (S8). The reproducing light quantity is set to $c \times P_o$ which is the value increased by adding only a predetermined amount to the optimum value $P_o$ (S9), where a>c>1. As a result, the crosstalk and cross-erase from the adjacent tracks are detected with high sensitivity. The test record pattern of the track Tr(n) is read out so as to detect the signal amplitude (S10). Here, the signal amplitude and the recording light quantity are stored in relation to one another (S11). The recording light quantity is increased only by a predetermined amount (S12). It is decided whether the recording light quantity has exceeded the upper limit value $(a+b) \times P_o$ of the test range (S13). When it is decided that the upper limit value has not exceeded the test range, the sequence returns to S7 and the test record pattern is recorded again. When it is decided that the upper limit value has exceeded the test range, the maximum value is found from the signal amplitudes stored (S14). The recording light quantity corresponding to the maximum signal amplitude is decided to be the optimum recording light quantity (S15). In this manner, since the recording light quantity is set in accordance with the optimum reproducing light quantity $P_o$ as a reference, the maximum recording light quantity is prevented from becoming excessively large.

Figure 11:
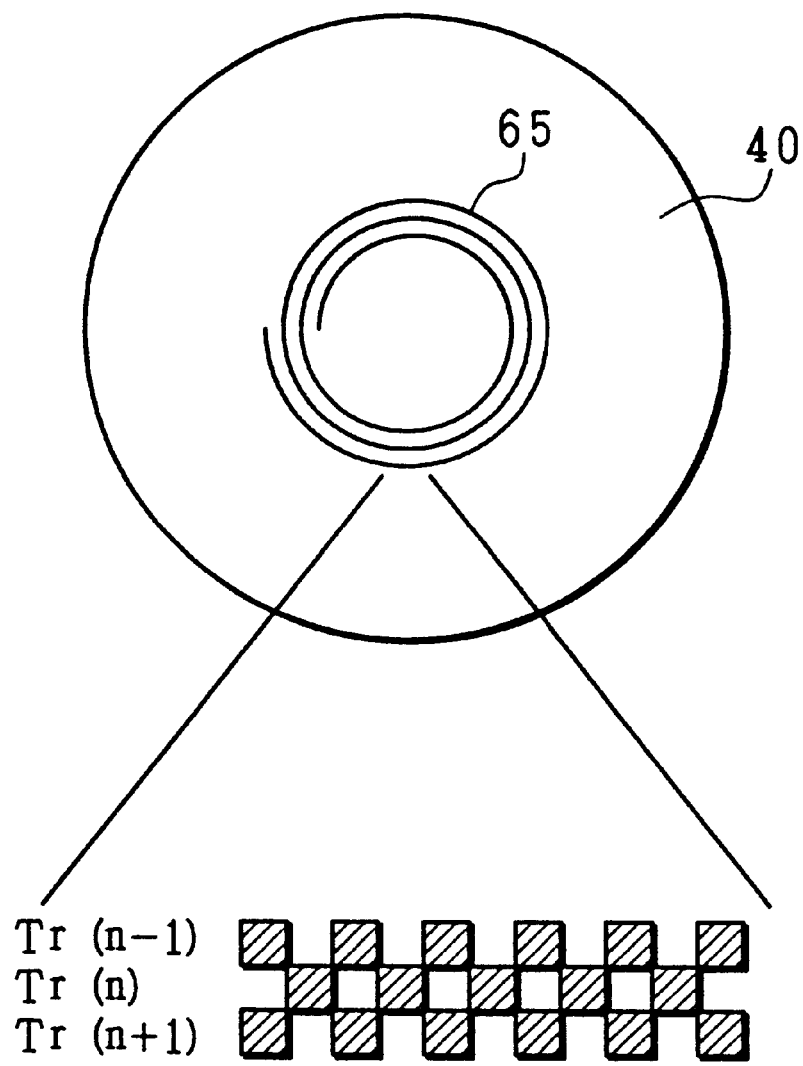
FIG. 11 is an explanatory drawing showing a magneto-optical disk of FIG. 4.
Figure 12:
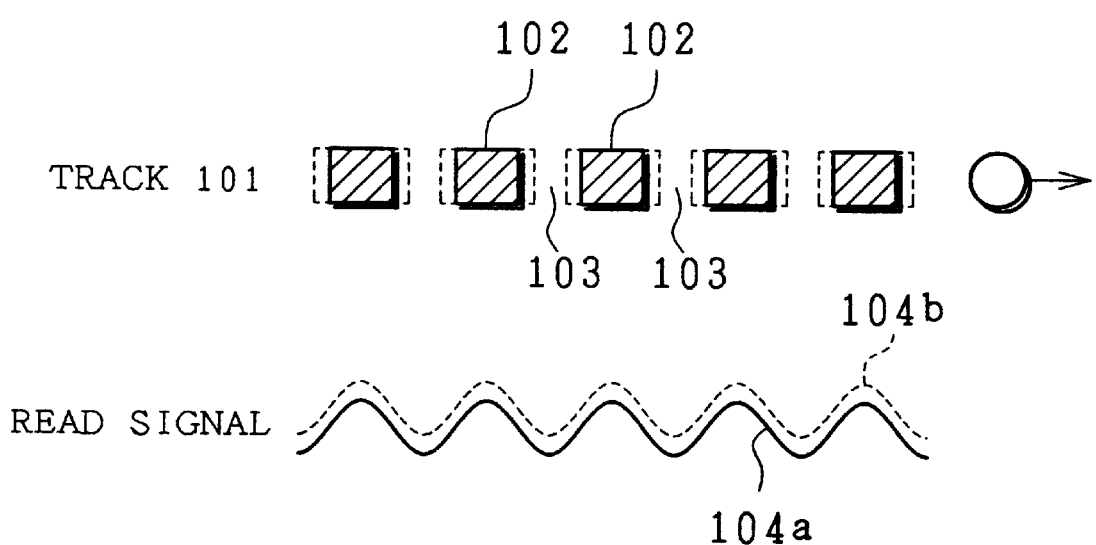
FIG. 12 is an explanatory drawing illustrating a conventional recording conditions controlling method.

FIG. 11 is a drawing which explains a track position of the magneto-optical disk used in the described recording conditions controlling method. A track region for controlling the recording condition is provided on a portion 65 of a lead-in region of the magneto-optical disk 40. Here, a plurality of tracks adjacent to one another are allocated. In the case of land/groove recording, not limiting to lands and grooves, a plurality of continuous adjacent tracks are allocated. In the track region, there are provided at least (i) reference marks for generating an external clock and (ii) a pattern recording region on the plurality of continuous tracks. From the lead-in region, a region on which TOC information is recorded is reproduced, and in the case where it is confirmed that recording has been made, the reproducing control pattern included in this information is read out so as to control the reproducing light quantity. Then, moving to the recording condition control region, the test record pattern and the reversed test record pattern are recorded while successively changing the light quantity so as to determine the optimum value of the recording light quantity with high sensitivity.

Note that, the above embodiment described the method for obtaining the optimum value of the recording light quantity. However, optimization of recording magnetic field strength can also be carried out in a similar manner. Also, the above embodiment is based on the case of magnetic modulation recording; however, because a change in width of the record mark can also be detected by the signal amplitude in light modulation recording, the optimum value of the recording light quantity can also be determined with high sensitivity in light modulation recording as well.

As described, a first recording conditions controlling method for an optical memory device in accordance with the present invention includes the steps of: a reproducing condition controlling step for projecting light on an optical recording medium on which information is recorded and measuring a reproducing signal read so as to control a reproducing condition optimum; and a recording condition controlling step for controlling a recording condition in accordance with the reproducing condition optimized.

Therefore, the optimum reproducing condition follows the heat capacity of the optical recording medium and/or a change in environment temperature. Further, because controlling of the recording condition is carried out in accordance with this optimum reproducing condition, the set range of the recording light quantity also follows the heat capacity of the optical recording medium and/or a change in environment temperature. For this reason, the temperature of the optical recording medium does not increase excessively, and it is possible to prevent destruction by heat.

As described, a second recording conditions controlling method for an optical memory device in accordance with the present invention, in the first recording conditions controlling method, is the method wherein the reproducing condition controlling step includes the steps of: (1) measuring a first quality value of the reproducing signal; and (2) controlling the reproducing condition optimum so that the first quality value approaches a predetermined value, and the recording condition controlling step includes the steps of: (3) setting a plurality of predetermined recording conditions by changing a light quantity of a light beam or a strength of an externally applied magnetic field in accordance with the reproducing condition optimized; (4) recording test record patterns on the optical recording medium; (5) reading the test record patterns so as to measure second quality values of reproducing signals read; (6) storing the plurality of predetermined recording conditions and the second quality values in relation to one another; and (7) searching a value, which is closest to a predetermined value, from the second quality values stored so as to determine a recording condition.

Therefore, by reproducing a signal recorded, it is possible to obtain an optimum reproducing light quantity that accurately follows the heat capacity in the vicinity of the recording layer of the optical recording medium and/or the surrounding temperature. Further, because controlling of the recording condition is carried out in accordance with this reproducing light quantity, the set range of the recording light quantity also accurately follows the heat capacity in the vicinity of the recording layer and/or with a change in surrounding temperature.

As described, a third recording conditions controlling method for an optical memory device in accordance with the present invention, in the second recording conditions controlling method, is the method wherein in the step (5), the test record patterns are read in accordance with a reproducing condition obtained in the step (2).

Therefore, because the test record patterns are read with the optimum light quantity which has been determined beforehand, it is not required to newly control the reproducing light quantity, allowing quick finishing of the recording light quantity control.

As described, a fourth recording conditions controlling method for an optical memory device in accordance with the present invention, in the third recording conditions controlling method, is the method wherein in the step (5), the test record patterns are read by increasing the reproducing condition obtained in the step (2) by a predetermined amount.

Therefore, the aperture generated on the reproducing layer of the optical recording medium is widened in the width direction of the record mark. This allows the crosstalk and cross-erase of the adjacent tracks to be detected with higher sensitivity when detecting the test record pattern.

As described, a fifth recording conditions controlling method for an optical memory device in accordance with the present invention, in the second recording conditions controlling method, is the method wherein the step (4) includes the steps of: recording a test record pattern on a first track of the optical recording medium; and recording a reversed pattern of the test record pattern on second tracks adjacent to the first track.

Thus, the maximum value of a read signal during controlling of the recording condition is detected with high sensitivity, and the optimum value of the recording condition is determined in accordance with this detection. Here, the record mark has the widest width and accordingly the signal quantity is large. This minimizes the crosstalk from adjacent tracks, thus realizing high-density tracks.

As described, a sixth recording conditions controlling method for an optical memory device in accordance with the present invention, in the second or fifth recording conditions controlling method, is the method wherein the step (4) includes the steps of: recording the reversed pattern beforehand on the second tracks with a large recording light quantity or a large recording magnetic field strength; recording the test record pattern on the first track while gradually increasing a recording light quantity or a recording magnetic field strength from a low initial value; and recording again the reversed pattern on the second tracks.

Therefore, a change in signal quantity read becomes large by the crosstalk even with a small recording light quantity or with a weak recording magnetic field strength. This allows the maximum value of the read signals to be detected with high sensitivity, making it possible to determine the optimum value of the recording condition.

As described, a seventh recording conditions controlling method for an optical memory device in accordance with the present invention, in the fifth or sixth recording conditions controlling method, is the method wherein reference mark signals are read from the optical recording medium, on which reference marks are recorded beforehand with predetermined intervals, so as to record the test record pattern and the reversed pattern of the step (4) in accordance with an external clock synchronizing with the reference mark signals.

Therefore, the test record pattern recorded on the track and the reversed test record pattern recorded on the adjacent tracks are recorded in accurate synchronization in accordance with the external clock. As a result, the occurrence of crosstalk is increased and a change in signal amplitude is made larger, making it possible to determine an optimum recording condition with high sensitivity.

Note that, "small recording light quantity" and "large recording light quantity" refer to quantities of recording light that are small and large enough, respectively, with respect to a recording light quantity which is thought to be appropriate.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A recording conditions controlling method, comprising the steps of:
    (a) controlling a reproducing condition in accordance with a reproducing signal read from a first mark of an optical recording medium so as to determine an optimum reproducing condition which minimizes an error rate of reproducing data; and
    (b) recording a second mark by controlling a recording condition under the optimum reproducing condition and determining a recording condition which maximizes an amplitude of a reproducing signal from the second mark so as to record information on the optical recording medium in accordance with the recording condition thus determined.

2. The method as set forth in claim 1, wherein:
    the first mark is composed of a long mark and a short mark, and
    in said step (a), a minimum error rate is determined in such a manner that a difference between an amplitude ratio of a reproducing signal of the long mark to a reproducing signal of the short mark and a target amplitude ratio approaches zero.

3. The method as set forth in claim 1, wherein:
    said step (b) includes the step of recording the second mark on a track of the optical recording medium and carrying out erasing with respect to each of two tracks adjacent to the track by an amount equal to a width of the second mark,
    said step being carried out repeatedly for each width of the second mark while gradually increasing the width thereof so as to control the recording condition in such a manner that an amplitude of a reproducing signal from the second mark is maximized.

4. The method as set forth in claim 3, wherein the width of the second mark is increased while gradually increasing a light quantity of a light beam projected on the track or a strength of an externally applied magnetic field.

5. The method as set forth in claim 3, wherein a quantity of reproducing light for reproducing the second mark is set to be 5 percent to 20 percent larger than that of normal reproducing light.

6. The method as set forth in claim 1, wherein:
    the second mark is composed of first through third record marks, and
    said step (b) includes the steps of:
        (b-1) recording the second and third record marks each with a predetermined width with respect to second and third tracks adjacent to a first track of the optical recording medium, respectively, in accordance with a predetermined clock, prior to recording of the first record mark on the first track;

(b-2) recording the first record mark with a record pattern, which is a reversed record pattern of the second and third record marks, with respect to the first track in accordance with the predetermined clock; and (b-3) recording the second and third record marks each with a width equal to a width of the first record mark of said step (b-2) with respect to the second and third tracks, respectively, in accordance with the predetermined clock, said steps of (b-2) and (b-3) being carried out repeatedly for each width of the first record mark while gradually increasing the width thereof so as to control the recording condition in such a manner that an amplitude of a reproducing signal from the first record mark is maximized.

7. The method as set forth in claim 6, wherein the widths of the first through third record marks are increased while gradually increasing a light quantity of a light beam projected on the first through third tracks or a strength of an externally applied magnetic field.

8. The method as set forth in claim 6, wherein a quantity of reproducing light for reproducing the first record mark is set to be 5 percent to 20 percent larger than that of normal reproducing light.

9. A recording conditions controlling method for an optical memory device, comprising the steps of:

a reproducing condition controlling step for projecting light on an optical recording medium on which information is recorded and measuring a reproducing signal read so as to control a reproducing condition optimum; and a recording condition controlling step for controlling a recording condition under the reproducing condition optimized.

10. The method as set forth in claim 9, wherein said reproducing condition controlling step includes the steps of:

(1) measuring a first quality value of the reproducing signal; and (2) controlling the reproducing condition optimum so that the first quality value approaches a predetermined value, and said recording condition controlling step includes the steps of:

(3) setting a plurality of predetermined recording conditions by changing a light quantity of a light beam or a strength of an externally applied magnetic field under the reproducing condition optimized;

(4) recording test record patterns on the optical recording medium;

(5) reading the test record patterns so as to measure second quality values of reproducing signals read;

(6) storing the plurality of predetermined recording conditions and the second quality values in relation to one another; and (7) searching a value, which is closest to a predetermined value, from the second quality values stored so as to determine a recording condition.

11. The method as set forth in claim 10, wherein in said step (5), the test record patterns are read under the reproducing condition obtained in said step (2).

12. The method as set forth in claim 11, wherein in said step (5), the test record patterns are read by increasing the reproducing condition obtained in said step (2) by a predetermined amount.

13. The method as set forth in claim 10, wherein said step (4) includes the steps of:

recording a test record pattern on a first track of the optical recording medium; and recording a reversed pattern of the test record pattern on second tracks adjacent to the first track.

14. The method as set forth in claim 10, wherein said step (4) includes the steps of:

recording the reversed pattern beforehand on the second tracks with a large recording light quantity or large recording magnetic field strength;

recording the test record pattern on the first track while gradually increasing a recording light quantity or a recording magnetic field strength from a low initial value; and recording again the reversed pattern on the second tracks.

15. The method as set forth in claim 13, wherein said step (4) further includes the steps of:

recording the reversed pattern beforehand on the second tracks with a large recording light quantity or large recording magnetic field strength;

recording the test record pattern on the first track while gradually increasing a recording light quantity or a recording magnetic field strength from a low initial value; and recording again the reversed pattern on the second tracks.

16. The method as set forth in claim 13, wherein reference mark signals are read from the optical recording medium, on which reference marks are recorded beforehand with predetermined intervals, so as to record the test record pattern and the reversed pattern of said step (4) in accordance with an external clock synchronizing with the reference mark signals.

17. The method as set forth in claim 14, wherein reference mark signals are read from the optical recording medium, on which reference marks are recorded beforehand with predetermined intervals, so as to record the test record pattern and the reversed pattern of said fourth step in accordance with an external clock synchronizing with the reference mark signals.

18. The method as set forth in claim 15, wherein reference mark signals are read from the optical recording medium, on which reference marks are recorded beforehand with predetermined intervals, so as to record the test record pattern and the reversed pattern of said fourth step in accordance with an external clock synchronizing with the reference mark signals.

19. A recording conditions controlling method, comprising the steps of:

determining an optimum reproducing condition based on a signal quantity which is obtained by projecting light of varying power on an optical recording medium on which information is recorded;

recording information on the optical recording medium by varying a recording condition;

obtaining a reproduced signal from a recorded pattern under the optimum reproducing condition; and determining a recording condition based on the reproduced signal.

20. A recording condition controlling method for an optical recording device, the method comprising:

(1) projecting light on an optical recording medium on which information is recorded, so as to measure a first quality value of a read-out reproduced signal;

(2) controlling an optimum reproducing condition based on the first quality value;

(3) setting a predetermined plurality of recording conditions by varying light quantity of a light beam or intensity of an externally applied magnetic field;

(4) recording a test recording pattern on the optical recording medium;

(5) reading the test recording pattern based on the reproducing condition which was obtained in said step (2) so as to measure a second quality value of a reproduced signal;

(6) relationally storing the recording conditions and the second quality value; and (7) deciding a recording condition based on the stored second quality value.

21. The method as set forth in claim 20, wherein the recording condition is decided in said step (7) by searching a range of recording conditions in which the stored second quality value takes a predetermined value, and by determining an intermediate value of the range.

22. The method as set forth in claim 20, wherein in said step (5), the test record patterns are read by increasing the reproducing condition obtained in said step (2) by a predetermined amount.

23. The method as set forth in claim 20, wherein said step (4) includes the steps of:

recording a test record pattern on a first track of the optical recording medium; and recording a reversed pattern of the test record pattern on second tracks adjacent to the first track.

24. The method as set forth in claim 20, wherein said step (4) includes the steps of:

recording the reversed pattern beforehand on the second tracks with a large recording light quantity or large recording magnetic field strength;

recording the test record pattern on the first track while gradually increasing a recording light quantity or a recording magnetic field strength from a low initial value; and recording again the reversed pattern on the second tracks.

25. The method as set forth in claim 23, wherein said step (4) further includes the steps of:

recording the reversed pattern beforehand on the second tracks with a large recording light quantity or large recording magnetic field strength;

recording the test record pattern on the first track while gradually increasing a recording light quantity or a recording magnetic field strength from a low initial value; and recording again the reversed pattern on the second tracks.

26. The method as set forth in claim 23, wherein reference mark signals are read from the optical recording medium, on which reference marks are recorded beforehand with predetermined intervals, so as to record the test record pattern and the reversed pattern of said step (4) in accordance with an external clock synchronizing with the reference mark signals.

27. The method as set forth in claim 24, wherein reference mark signals are read from the optical recording medium, on which reference marks are recorded beforehand with predetermined intervals, so as to record the test record pattern and the reversed pattern of said fourth step in accordance with an external clock synchronizing with the reference mark signals.

28. The method as set forth in claim 25, wherein reference mark signals are read from the optical recording medium, on which reference marks are recorded beforehand with predetermined intervals, so as to record the test record pattern and the reversed pattern of said fourth step in accordance with an external clock synchronizing with the reference mark signals.

* * * * *